UNITED STATES PATENT OFFICE.

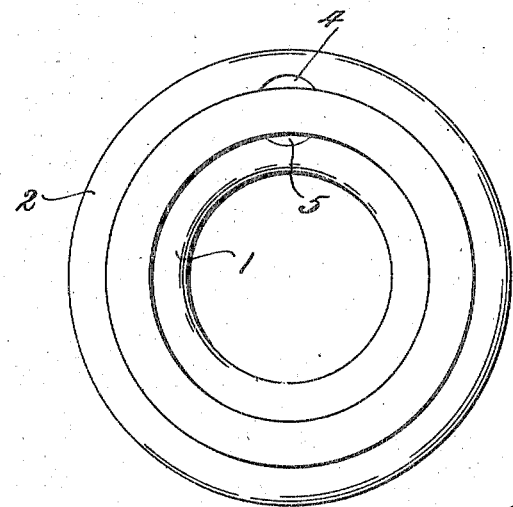
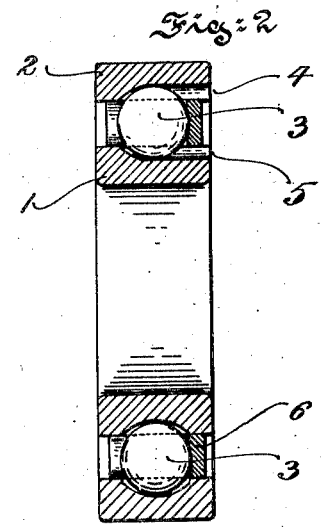
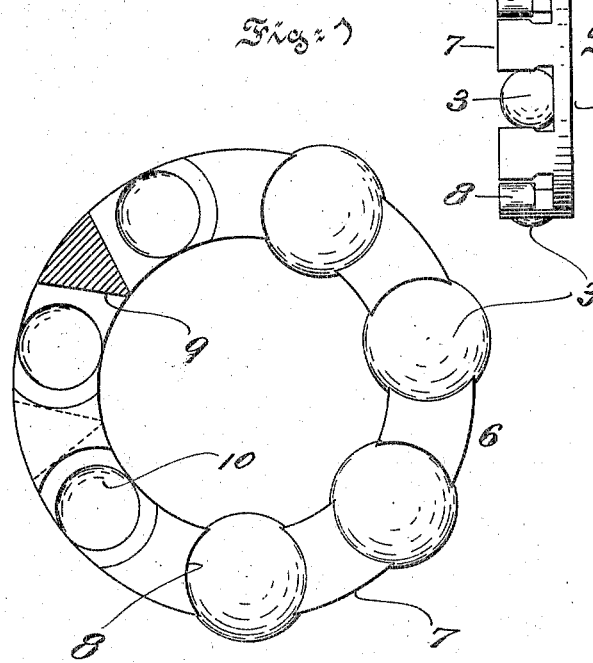
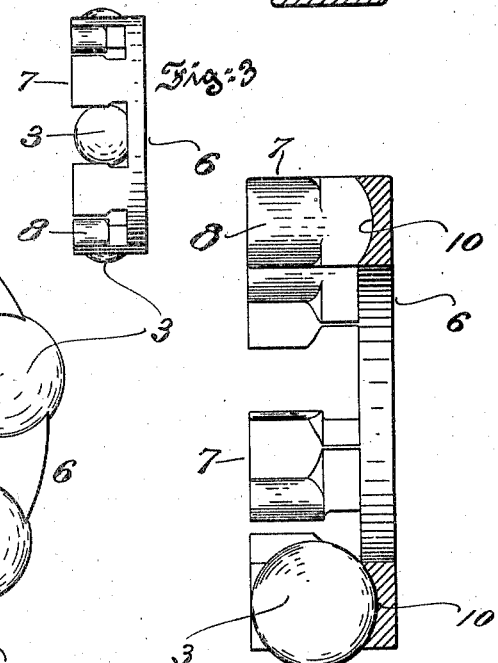

SAMUEL S. EVELAND, OF PHILADELPHIA, PENNSYLVANIA.

BALL-BEARING.

No. 811,708.　　　　Specification of Letters Patent.　　　Patented Feb. 6, 1906.

Application filed September 21, 1905. Serial No. 279,405.

*To all whom it may concern:*

Be it known that I, SAMUEL S. EVELAND, a citizen of the United States, residing at the city of Philadelphia, in the county of Philadelphia and State of Pennsylvania, have invented certain new and useful Improvements in Ball-Bearings, of which the following is a specification.

Objects of the present invention are to provide an efficient and compact bearing in which the concentric bearing members are movably held in proper relation by the balls between them and in which there is a spacer for the balls, to provide for convenience in assembling the parts, and to so construct and arrange the parts that they remain in assembled relation and can be handled in a body.

The nature, characteristic features, and scope of my invention will be more fully understood from the following description, taken in connection with the accompanying drawings, forming part hereof, and in which—

Figure 1 is an elevational view of a bearing embodying features of the invention, and Fig. 2 is a sectional view. Fig. 3 is an edge view of the ball spacer and retainer with some of the balls removed; and Figs. 4 and 5 are face and edge views, partly in section, showing the ball retainer or spacer with part of the balls removed.

In the drawings, 1 and 2 are concentrically-arranged rings, of which the ring 2 is grooved upon its inner face and the ring 1 is grooved upon its outer face, so as to constitute grooves in which the balls 3 run.

4 and 5 are notches in the rings 2 and 1, and they are an example of means by which the balls may be placed between the rings and in the grooves thereof.

The ball-retainer consists of a crown-toothed ring 6, having the ends 7 of its teeth enlarged and provided with concave radially-arranged faces 8 to permit of the insertion and removal of the balls and having the shanks of the teeth cut away and inclined, as at 9, so as to form, with countersinks 10 in the ring proper, ball-sockets into and out of which the balls may be sprung.

Balls are inserted between the rings 1 and 2 and are then arranged with spaces between them. The retainer is then inserted between the rings in such a way that the balls enter through the spaces bounded by the concave portions 8, springing their way into the pockets formed by the countersinks 10, the under sides of the enlarged ends, and the inclined portions 9.

Thus the various parts of the device are detachably connected together in a body against accidental displacement, while the balls are free to run in the grooves and are properly held apart by the retainer. At the same time the various members may be readily taken apart for repairs or other purposes.

Having thus described the nature and objects of my invention, what I claim as new, and desire to secure by Letters Patent, is—

1. A bearing comprising the combination of concentric rings whereof one is grooved on its inner and whereof the other is grooved on its outer face, balls interposed between said rings and arranged in said grooves, and a cage comprising a crown-toothed ring having between its teeth countersinks and having the ends of its teeth enlarged and provided with concave faces to permit of the insertion of balls and having the shanks of the teeth inclined to form with said countersinks and the enlarged heads ball-sockets, substantially as described.

2. A bearing comprising the combination of concentric rings whereof one is grooved on its inner and whereof the other is grooved on its outer face, balls interposed between said rings and arranged in said grooves, and a cage comprising a crown-toothed ring having between its teeth ball-seats and having the ends of its teeth enlarged and provided with passages to permit of the insertion of balls and having the shanks of the teeth arranged to form with said ball-seats and the enlarged heads ball-sockets, substantially as described.

In testimony whereof I have hereunto signed my name.

SAMUEL S. EVELAND.

In presence of—
　W. J. JACKSON,
　FRANK E. FRENCH.